Patented Mar. 23, 1954

2,672,671

UNITED STATES PATENT OFFICE 2,672,671

ALUMINA-MULLITE PEBBLES

Sam P. Robinson, La Porte, Tex., assignor to Phillips Petroleum Company, a corporation of Delaware No Drawing. Application November 13, 1952, Serial No. 320,337

22 Claims. (Cl. 25—157)

The invention relates to the manufacture of mullite-alumina pebbles for use in pebble heaters and in other heat exchange applications. A specific aspect of the invention pertains to a method of manufacturing mullite-alumina pebbles having high breakage resistance under severe conditions of cyclic thermal and mechanical shock and high attrition resistance in moving bed types of heat transfer apparatus.

This application is a continuation-in-part and consolidation of my copending applications Serial Nos. 52,774, 67,772, and 67,773 filed October 4, 1948, December 28, 1948, and December 28, 1948, respectively, now abandoned.

Pebble heater techniques being developed and applied to various gas heating and reaction processes at the present time make use of a compact stream of small refractory pebbles as a moving heat-exchange medium. These pebbles which are usually ceramic materials, although they may be metallic for some applications, are spheres ranging in size from about $\frac{1}{8}''$ to $1''$ in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as the pebbles descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or cool a gas. The pebbles are cooled by contact with a cold gas in one chamber and the cold pebbles are then gravitated through a second chamber in contact with the gas to be cooled. In such processes the pebbles undergo great changes in temperature with the usual mechanical shock and attrition forces involved in gravitating masses of pebbles.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute at maximum temperatures in the neighborhood of 3000° F. In addition to the severe shock resulting from such rapid temperature changes, the pebbles are subjected to considerable mechanical shock and attrition in passing through the apparatus, the former especially, in the elevator equipment and in dropping from the top of the elevator into the top of the pebble heating zone and the latter in passing through the chambers, the throat or throats between chambers and in the pebble flow-regulating feeder. It is found that considerable breakage and attrition of pebbles occurs when using conventional commercial pebbles under such severe conditions of operation. Pebbles which have been made from powdered alumina, mullite, and similar materials, by wetting the powder and rolling the material in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operating conditions. However, it has been found that even when pebbles have been made by slugging and compacting the slugs into balls, they must be fired at a temperature within a critical range in order to properly bond the pebble crystals and produce a pebble which is rugged under severe conditions of service. Pure alumina pebbles require firing in the range of 3000° to 3150° F. to develop the most rugged pebble as is disclosed in my application Serial No. 23,245, filed in the U. S. Patent Office April 26, 1948, U. S. Patent No. 2,635,950, April 21, 1953; and it has been found that the alumina-mullite pebbles of this invention must be fired within the critical range of 2900° to 3200° F. in order to develop the most effective bond and the most rugged pebble.

The pebbles of the invention are utilized to advantage in such processes as those disclosed in my copending application Serial No. 662,149, filed April 15, 1946, relating to the cracking of hydrocarbons to hydrogen and coke, as well as the process of the copending application of M. O. Kilpatrick, Serial No. 761,696, filed July 17, 1947, relating to the thermal conversion of hydrocarbons to more desirable hydrocarbons. These processes involve temperature changes of the order of 1000 to 2000° F. per minute, with severe mechanical shock and abrasive forces present.

In a pebble heater process requiring the circulation of between 25,000 and 35,000 pounds of pebbles per hour with a maximum temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble.

The invention has several objects, viz.,

To provide a mullite-alumina pebble having high resistance to breakage under sever conditions of cyclic thermal and mechanical shock;

To provide a method of heat treating aluminum silicate-containing alumina pebbles which develops maximum bonding strength in the bond between pebble crystals and which stabilizes crystal growth;

To provide a method of manufacturing thermal and mechanical shock-resistant pebbles free from laminar structure;

To provide an effective method of bonding the crystals in a mullite-alumina pebble;

To provide a mullite-alumina pebble having high resistance to attrition loss upon continuous recycling through a heat transfer system.

Other objects of the invention will become apparent from a consideration of the accompanying disclosure.

In the accompanying drawings:

Figure 1 is a graphic illustration of the attrition resistance of alumina and mullite stabilized alumina pebbles in accelerated attrition mill;

Figure 2 is a graphic illustration of the heat-shock resistance of alumina and mullite stabilized alumina pebbles in accelerated heat-shock tester.

The invention is concerned with a method of manufacturing high purity, mullite-alumina pebbles which involves incorporating in a substantially pure alumina pebble aluminum silicate and then heat treating the pebble so as to form a strong bond between the resulting mullite and the alumina crystals. Incorporation of the aluminum silicate also effectively limits alpha corundum crystal size in the pebble after preferred heat treatment, stabilizes crystal size against further growth from cooling shock or high temperatures, reduces the sharpness of the corundum crystal edges, and produces a much smoother, less abrasive pebble surface. The lumina for the pebble is preferably in the form of lightly calcined and small alpha corundum crystals and should be at least 99% pure alumina and preferably 99.5% alumina. A typical analysis of alpha corundum suitable for the process is as follows:

|  | Per cent |
|---|---|
| $Al_2O_3$ | 99.5 |
| $Na_2O$ | 0.20 |
| $Fe_2O_3$ | 0.25 |
| $SiO_2$ | 0.05 |

However, the alpha corundum may be made from any aluminum oxide material by suitable purification and is preferably precalcined at a temperature in the range of 1800° to 2200° F. for best results. Any of the substantially pure alumina hydrates which are readily convertible to alpha corundum upon heating to the above range may be used as the source of the alumina for the pebble. Purified bauxite and the alumina manufactured by the Bayer process are examples of suitable raw materials for the alumina.

The incorporation into the pebbles of an aluminum silicate such as ball clay, kaolin, andalusite, kyanite, and sillimanite is preferred, but mullite may be used to produce an alumina pebble having an unusually strong bond. When aluminum silicate of the formula $Al_2O_3.2SiO_2$ or $Al_2O_3.SiO_2$ is incorporated in the pebble and heat treated according to the invention, the aluminum silicate is converted to mullite; and free $SiO_2$ is formed in the process. This free silica reacts with a portion of the alumina to form mullite and, therefore, additional binding material for the remaining alumina in the pebble. These silicates should be carefully chosen so that glass-forming impurities such as the oxides of iron and the alkali and alkaline earth metals are at a minimum. These silicates undergo mineralogical change before the preferred heat treatment has an appreciable effect on alpha corundum crystal growth. It has been found that they beneficially aid the formation of very small corundum crystals which are relatively stable to further growth usually induced when untreated high alumina pebbles undergo severe cooling strains or are exposed to high temperatures. Free silica is highly detrimental to the final pebble because of crystallographic inversion with temperature changes and resulting volume changes of the pebbles and, therefore, the mol ratio of silica to alumina in the unfired pebble mix or composition must always be less than 2 to 3 so that all of the silica is combined with alumina in the form of $3Al_2O_3.2SiO_2$ (mullite). Andalusite, kyanite, and sillimanite are converted into mullite at temperatures of approximately 2460° F., 2415° F., and 2786° F., respectively. Kaolin and ball clays are converted to more $Al_2O_3$-rich silicates and $SiO_2$ at lower temperatures. Mullite, itself decomposes at approximately 3325° F. to alpha corundum ($Al_2O_3$) and silica glass ($SiO_2$) and therefore under no circumstances should the pebble be heat treated at this temperature or higher.

The aluminum silicate or silicates may be incorporated in the finished pebble by adding plasticizing ball clay, kaolin, andalusite, kyanite, sillimanite, mullite or any mixtures thereof to the high purity alumina raw material. If mullite is added, it is preferable to add one of the more silica-rich silicates in addition. If kaolin or ball clay is used, it is preferable to add one of the more alumina-rich silicates (kyanite preferably) in addition. In the first instance a better bonding action is secured with greater dispersal of silica as mullite through the pebble after firing. In the second case, internal cracks in the pebble might develop from excessive shrinkage of the silicates upon conversion to mullite. Kaolin and ball clay are used to impart plastic properties to the stiff mud preceding the extrusion step in the ball making operations. Neither should be precalcined. If more alumina-rich silicates are used in any quanitity, it will be desirable to give them a precalcining up to 2500 to 2700° F. to substantially burn out future shrinkage (or expansion in the case of kyanite) and to substantially convert them to mullite and silica glass. This silica will still be available for reacting with excess $Al_2O_3$ in the ball when re-firing. It is desirable that a light calcined $Al_2O_3$ be used at least in part so that there will be enough reactive $Al_2O_3$ present in the pebble to react with said silica or silica glass.

The preferred silicate additives are a mixture of ball clay and precalcined Indian kyanite. Both should be low in oxides of iron and the alkali and alkaline earth metals. The ball clay is added for plasticizing purposes and the calcined kyanite for volume stability, prevention of cracks and insurance of random orientation of principal mullite crystallographic axes in the final pebble. When kyanite is converted to mullite a change in crystal system is involved. This is not true when andalusite or sillimanite is converted to mullite. It is believed that the random orientation and distribution of mullite crystals is helpful in imparting resiliency and resistance to thermal shock in the final heat treated pebble. It is also believed that good kyanite, such as commercial Indian kyanite, produces more distinct needle-like crystals than are formed from sillimanite, andalusite and mixed clays.

While the preferred silicate additives are ball clay and calcined kyanite, it is neither necessary nor desired to be limited to their combined use or to the use of either alone or combined with other silicate minerals. Plasticizing ball clay can be replaced with organic plasticizers such as carboxymethyl cellulose or other well known compounds used for such purposes. The kyanite can be eliminated entirely and replaced with ball clay alone or ball clay mixed with other silicates. Good pebbles can be produced without using either ball clay or kyanite. An organic plasticizer plus one of the other silicate minerals or a mixture of them, if properly formulated and heat treated, will produce a good heat shock and attrition resistant pebble. It is preferred, however, to use enough ball clay to give desired plastic properties to the stiff mud before extrusion and tumbling into balls and enough kyanite to add the remainder of the desired silica content (or mullite content) in the final pebble. A good plastic ball clay has the unique qualities of being a good aluminum silicate raw material, a good (if not the best) plasticizing agent for the process, and a good inorganic bonding agent to hold the balls together without change during the drying and firing processes. The amount of plasticizing ball clay used will depend upon such properties as the plasticizing power of the clay itself, the fineness of the purified alumina and additional aluminum silicate raw material, and the amount of water used in the preparation of the stiff mud made for the extrusion and balling operations.

The aluminum silicate or mixed silicates should be added on the basis of a chosen fixed ratio of total $SiO_2$ to total $Al_2O_3$ in the final heat treated pebble or on a mullite to alumina ratio or percentage. As little as 1% mullite in the final mullite-alumina pebble will impart improved performance properties as compared with a 100% alumina pebble. The mullite content may range as high as 98% (by weight) with excellent results.

The pebbles of the invention ranging in composition from 1 to 98% mullite and from 2 to 98% alumina, with allowance for up to 1 or 2% free silica and impurities fall into three species in accordance with their physical characteristics, type A, containing from 1 to 33% mullite, type B, pebbles containing from 35 to 65% mullite and type C, pebbles containing 66 to 98% mullite, the balance in each instance being alumina and a small amount of silica and impurities (less than 2%). As the mullite content is increased and the alumina content is correspondingly decreased, the strength and density, resistance to reduction, thermal conductivity, and heat capacity become slightly lower while the resistance to abrasion, thermal shock, crystal growth, spalling and fatigue become greater. Hence, it is apparent that each type of pebble has its advantages in different processes under specific operating conditions.

The amounts of mullite and alumina in the pebbles of the invention range from 1 to 98% and from 2 to 98%, respectively, and the proportions of alumina and aluminum silicate raw materials are selected so as to produce finished pebbles of this composition. Aluminum silicates, in which the ratio of silica to alumina is greater than 2:3, convert to mullite in the presence of uncombined alumina according to the following equations:

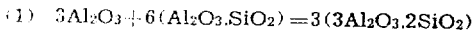

(1) $3Al_2O_3 + 6(Al_2O_3.SiO_2) = 3(3Al_2O_3.2SiO_2)$

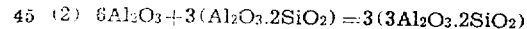

(2) $6Al_2O_3 + 3(Al_2O_3.2SiO_2) = 3(3Al_2O_3.2SiO_2)$

It is readily apparent that aluminum silicates of the form $Al_2O_3.SiO_2$ and of the form $Al_2O_3.2SiO_2$ can be used with free alumina, either singly or in combination, in proportions which will form the proportion of mullite desired in the finished pebble.

When manufacturing pebbles of type A, in order to arrive at a pebble composition containing a maximum of about 33 wt. per cent of mullite, about 12 wt. per cent silica in the form of aluminum silicate is used, based on the weight of the alumina. When a minimum of mullite (1%) is desired, about 0.3 wt. per cent of silica based on the weight of the alumina is required. While a slight variation in mullite content will result depending upon whether aluminum silicate of the formula $Al_2O_3.SiO_2$ or $Al_2O_3.2SiO_2$, or a mixture of these silicates is used, the variation is so slight as to be insignificant.

When manufacturing pebbles of type B, a weight ratio of alumina to aluminum silicate in the range of approximately 1:1 to 5:1 is required depending upon the type of aluminum silicate used and/or the proportions of each type. A mixture of one part by weight of alumina and one part by weight of aluminum silicate of the formula $Al_2O_3.SiO_2$ produces a pebble containing about 35% alumina and about 65% mullite while a mixture of 3 parts alumina and 1 part aluminum silicate results in a final pebble containing about 65% alumina and about 35% mullite. When using aluminum silicate of the formula $Al_2O_3 \cdot 2SiO_2$ a mixture of 2 parts alumina and 1 part aluminum silicate produces a pebble containing about 35% alumina and about 65% mullite while a mixture of 5 parts of alumina and 1 part of aluminum silicate results in a pebble containing about 65% alumina and about 35% mullite. When using mixtures of two types of aluminum silicates and when incorporating mullite as the raw material into the pebble composition, the proper proportions can be readily determined for any final pebble composition desired within the proportions of alumina and mullite specified.

When manufacturing pebbles of type C, a weight ratio of alumina to aluminum silicate in the range of 1:3 to 2:1 is required depending upon the type of aluminum silicate used and/or the proportions of each type. A mixture of 1 part by weight of alumina and 3 parts by weight of aluminum silicate of the formula $Al_2O_3 \cdot SiO_2$ results in a pebble composed of 98% mullite and 2% alumina by weight, while equal parts of alumina and aluminum silicate produce a pebble containing about 66 mullite and 34 alumina. When using aluminum silicate of the formula $$Al_2O_3 \cdot 2SiO_2$$

a mixture of 1 part alumina and 1 part aluminum silicate produces a pebble composed of 98% mullite and approximately 2% alumina, while a mixture of raw materials containing 2 parts by weight of alumina and one part by weight of aluminum silicate results in the formation of a pebble consisting of about 66% mullite and 34% alumina. When using mixtures of the two types of aluminum silicates and when incorporating mullite as raw material into the pebble composition, the proper proportions can be readily determined for any final pebble composition desired within the proportions of alumina and mullite specified for the invention.

It has already been emphasized that the alumina raw material of the pebble must be of high purity. The aluminum silicate should also be of high purity so as not to introduce materials into the pebble which will lower the melting point or interfere with the proper bonding of the pebble. Both the alumina and the aluminum silicate should be finely comminuted before or during the mixing of these materials to form the plastic mix from which pebbles are to be formed. A particle size in the range of about 150 to 400 mesh, or finer, is suitable with a mesh size of about 325 being preferred. At least 80 per cent of the material from which the pebble is formed should be of a fineness of at least 150 mesh. Utilization of finely divided alumina and aluminum silicates in the mix from which the pebbles are formed insures the production of pebbles which are extremely fine-grained and have the unmistakable appearance of a homogeneous fine-grained material in contrast to alumina-mullite refractories which appear to be made up of large alumina crystals dispersed in a mass of mullite and/or alumina-mullite crystals which has the appearance of, and is, a heterogeneous material.

It is found that a heat treatment in the range of 2900° to 3200° F. for a period of at least 2 hours and up to 68 hours is required in order to properly bond the pebble material and produce a pebble which is highly resistant to breakage under the severe conditions of cyclic thermal and mechanical shock involved in pebble heater operation. The optimum firing time for producing the strongest pebble from a pebble of a given composition of aluminum silicate and alumina depends upon the particular temperature in the range stated hereinbefore and the particular composition of the pebble. The time of heating must be such that the final porosity of the pebble lies in the range of 5 to 20 per cent and preferably in the range of 8 to 15 per cent. A more effective and preferred range of heating is between 2950° and 3100° F. for a period of at least 2 hours and until the desired porosity is obtained.

In compacting pebbles according to the invention, a plastic mix or stiff paste is formed of powdered precalcined alumina, plasticizing agent, and powdered precalcined aluminum silicate with a suitable amount of water. In order to form a homogeneous mix or paste, it may be desirable to treat the mixture in a ball mill for an extended period until the mix is completely homogeneous and plastic. Good mixing of raw materials is very desirable and necessary. After preparation of the mix, it is dried or otherwise dewatered to a moisture content in the range of 10 to 20 per cent by weight in order to provide suitable consistency for extrusion. The partially dried mix or paste is then extruded through dies in either a piston or screw type extrusion press into long macaroni type cylinders or rods which are then automatically cut off into short lengths corresponding to the diameter of the rods so as to facilitate the ball shaping step. Drying the paste to a moisture content between 10 and 20 per cent is necessary in order to permit proper extrusion of the paste. Deairing is very desirable in auger type extrusion presses. When making $\frac{5}{16}''$ pebbles, extrusion of the plastic mix into $\frac{3}{8}''$ rods, followed by cutting the rods into $\frac{3}{8}''$ slugs permits the compacting of the slugs into approximately $\frac{3}{8}''$ pebbles. High pressure extrusion of this type, with or without deairing of the feed, is much preferred to other methods of preparing the slugs for the pebble balling operation to follow, inasmuch as a homogeneous body results with minimum variations in structure after firing. However, other methods of preparing the slugs are within the scope of the invention.

The moisture content of the alumina paste during the extrusion step is important because when it amounts to much less than about 10 per cent, the slugs formed from the extruded rods are not completely homogeneous in structure and will result in the formation of an inferior pebble. If the moisture content greatly exceeds about 20 per cent, the extruded rod is too sticky and the slugs cannot be handled properly in the subsequent balling step.

One modification of the pebble forming process comprises preparing a homogeneous plastic mix of the alumina and aluminum silicate raw materials and adjusting the water content to the range of 10% to 20% by weight of the mix. The mix is then extruded, cut into short lengths (slugs), and balled in a suitable balling machine.

In a preferred modification of the pebble forming process the paste or mix is dried to a water content in the range of 15% to 20%, preferably 16% to 18%, extruded and cut into slugs, and then dried to a water content between 10% and 15%, preferably 11.5% to 13%, before balling the slugs. The drying step intermediate the extrusion and ball forming step produces more uniform pebbles.

When the mix is extruded, slugged, and balled without an intermediate drying step, it is generally desirable to pass a stream of drying gas over the slugs during the ball forming step so that the moisture content is gradually lowered as the balls are compacted.

Compacting of the alumina-aluminum silicate slugs into balls or pebbles can be performed in several ways. Rolling of the slugs in a balling machine utilizing three dimensional rotation in a cylindrical drum placed at angles to all three axes of conventional rotary equipment is found to make the most suitable pebbles after firing. The balls are more firmly compacted and nearly spherical in shape than when made by any other known method. This is probably due to the fact that the slugs are rolled in all directions during the rolling or compacting step. The resulting spherical pebbles with proper moisture content do not stick together and may be stored temporarily or transferred directly to the next step which is the drying operation. Drying to at least 1 wt. percent and preferably to zero moisture content in low temperature drying equipment is essential to prevent warpage and cracking from fast heating in the calcining operation.

The critical firing temperature of the compacted balls of alumina-aluminum silicate as stated hereinbefore lies in the range of 2900° to 3200° F. The firing within this range must be continued until the porosity of the pebbles lies between 5 and 20%, preferably between 8 and 12%, and the average crystal size of the alumina crystals lies between 0.5 and 50 microns, preferably between 1 and 25 microns. When either hydrated alumina or gamma alumina is included in the initial pebble composition, it is gradually converted to alpha alumina (alpha corundum) as the heat treatment of the pebble continues at elevated temperatures upwards of 2000° F. and recrystallization of aluminum silicate of the formula $Al_2O_3 \cdot SiO_2$ or $Al_2O_3 \cdot 2SiO_2$ to mullite occurs, the mullite crystals being relatively fine and intimately commingled with the alumina crystals. The free silica formed in the conversion combines with free alumina to form additional mullite. It is believed that the needle-like interstitial crystals of mullite effectively separate individual corundum crystals and interlock with them during the heat treatment and the following cooling of the pebbles, so as to form an extremely strong bond between the pebble crystals. It is also believed that the presence of liquid silica glass at the temperature where corundum crystals usually start to grow, effectively retards and inhibits crystallization of $Al_2O_3$ into large crystals. The temperature and length of firing determine the porosity of the pebble which should not be below 5 per cent nor higher than 20 per cent. (By porosity, it is meant to include both the available and unavailable porosity of the pebble.)

Firing or calcination of the pebbles can be suitably effected in any conventional equipment which results in maintaining the entire mass of pebbles at an even temperature in the range specified during the calcination or commercial firing of the pebbles. Firing in continuous shaft kilns produces pebbles which are inferior for service in pebble heater operation because they are not uniformly heated in all parts of the bed, a large proportion being either underfired or overfired. The former are not strong and stand up poorly to heat and mechanical shock and to attritive conditions, while the latter are too rigid and soon develop cracks along large crystal faces which results in early breakage as well as excessive attrition in service. Much more uniform heating is obtained in periodic reverberatory kilns and continuous tunnel kilns, and the pebbles heated therein are superior to those fired in shaft kilns.

To illustrate the invention, the following examples are presented:

EXAMPLE I

TYPE A PEBBLES 11,961 lbs. of 325 mesh Bayer process purified alumina precalcined to 2100° F. is mixed with 333 lbs. of 325 mesh high grade plasticizing ball clay and 486 lbs. of 325 mesh precalcined Indian kyanite to give the desired final mullite content of about 10% by weight. (All weights are determined on dry basis.) Both ball clay and kyanite are carefully chosen to insure a minimum of glass forming impurities such as the oxides of iron and the alkali and alkaline earth metals.

The raw materials are fed to mulling pans where water is added to produce a stiff paste containing about 16% moisture. Plows discharge this stiff paste to a combination mixing, stirring, slicing conveyor which transfers the product to a non-deairing piston extrusion press equipped with automatic slicing knives. The extrusion press and knives produce a cylindrical pellet ⅜" in diameter by approximately ⅜" long.

A conveyor belt picks up these slugs and transfers them to a tumbling drum. This drum, circular in cross section and cylindrical in shape, is so placed in a frame that revolves about a horizontal axis that such revolving gives three dimensional tumbling action to the contents of the drum. The drum continuously takes feed and discharges essentially spherical balls. It is airswept with hot air to maintain 12% moisture in the pebbles discharged. It is designed to give a retention period of at least 20 minutes and preferably 30 minutes for the slugs before they are discharged.

The discharged pebbles are dried in a flue gas dryer to less than 1% moisture content. The dried pebbles are fired to 3000° F. for 12 hours in a periodic kiln. Approximately 24 hours are used to burn these pebbles to 3000° F. and another 36 hours is allowed for them to cool back to handling and storage temperatures.

The resulting pebble is approximately ⁵⁄₁₆" in diameter, has a composition of 89 wt. per cent alpha alumina, 10% mullite, and 1% other crystalline impurities and fluxed glass, and is characterized by an exceptional resistance to heat shock and attrition. Crushing resistance between two parallel plates ranges from 1500 to 3000 lbs. with an average of more than 2000 lbs. Porosity of these pebbles varies from 8 to 12% with an average of about 10.5% total and disconnected space.

Petrographic examination shows cryptocrystalline to isotropic substance containing a mixture of alumina, mullite, a small amount of partially converted raw material, and approximately 0.5–1% glass, and an index of refraction near 1.540. The alumina appears as laths and an equal number of irregular grains in a cryptocrystalline to opaque groundmass. Many of the alumina laths grade off at the boundary into cryptocrystalline material as if incompletely converted. All alumina grains contain air bubbles and cloudy impurities. The alumina laths are haphazardly orientated. Scattered more or less uniformly through the mass are roughly spherical patches of cloudy isotropic material giving the appearance of incompletely converted raw material. These average about 80 microns in diameter but vary from 100 microns to extremely small spots. Alumina laths run from a maximum length of 200 microns down to small needles. Irregular grains reach a maximum diameter of 100 microns and grade downward. About 10–30% of the crystals are composed of grains 50 microns or larger and the remainder is a cryptocrystalline groundmass in which the crystals range downward from 50 microns. The bond appears extremely tenacious as extremely thin sections of the entire pebble can be prepared with a minimum of holes resulting from a pulling away or loss of some of the larger grains during the grinding necessary to prepare the thin section.

Comparative attrition resistance in accelerated attrition tests of this preferred pebble can be noted in the data of Table I. Figure 1 of the drawing is a self-explanatory graphic illustration of the data of Table I.

superiority of mullite inhibited pebbles is attributed to careful heat treatment and the inhibited crystal growth of large, sharp, and improperly bonded alpha alumina or corundum crystals. This is especially true of surface crystals which in other pebbles comprising uninhibited alumina crystals are considerably larger and sharper with less strong intercrystalline bonds. The space between random oriented surface alumina crystals is substantially filled up with cryptocrystalline material tenaciously bonded to the alumina crystals and covering up sharp surface crystal edges to a remarkable degree.

The heat capacity, softening point, thermal conductivity, and other desirable properties of an all alumina pebble are not substantially effected.

The superior heat-shock resistance of these mullite stabilized alumina pebbles is shown in Table II and in Figure 2, which illustrates graphically the data of Table II.

TABLE II

*Half life (50% broken) of alumina and mullite-stabilized alumina pebbles treated in accelerated heat-shock test equipment.*

| Item and Curve (Fig. 2) | Pebble Type | Original Firing Treatment | Cycles Required |
|---|---|---|---|
| A | 99.5% Al₂O₃ | Commercial | 138 |
| B | 99.5% Al₂O₃ | do | 60 |
| C | 99.5% Al₂O₃ | do | 10 |
| Cr | 99.5% Al₂O₃ | C refired 24 hrs. @ 3,100° F | 175 |
| D | 99.5% Al₂O₃ | Commercial @ 3,180° F | 91 |
| E₃ | 90% Al₂O₃—10% Mullite | 12 hrs. @ 3,000° F | 500 |

TABLE I

*Relative attrition resistance of high purity alumina pebbles with and without mullite inclusion*

| Pebble | Composition | Firing Conditions | Attrition Loss Weight Percent | Attrition Loss Relative Loss |
|---|---|---|---|---|
| A | 99.5+% Al₂O₃ | Commercial | 29.3 | 7.72 |
| B | 99.5+% Al₂O₃ | do | 25.1 | 6.61 |
| C | 99.5+% Al₂O₃ | do | 36.0 | 9.47 |
| Cr | 99.5+% Al₂O₃ | Refired 24 hrs. @ 3,100° F | 17.5 | 4.71 |
| D | 99.5+% Al₂O₃ | Commercial @ 3,180° F | 21.7 | 5.72 |
| E | 90% Al₂O₃—10% Mullite | Commercial @ 3,000° F | 7.2 | 1.89 |
| E₁ | 90% Al₂O₃—10% Mullite | Laboratory—4 hrs. @ 3,000° F | 6.4 | 1.69 |
| E₂ | 90% Al₂O₃—10% Mullite | Laboratory—12 hrs. @ 3,000° F | 3.8 | 1.00 |
| E₃ | 90% Al₂O₃—10% Mullite | Laboratory—4 hrs. @ 3,100° F | 3.8 | 1.00 |

Test conditions

About 300 cc. of pebbles are weighed and introduced into cylindrical drum 6″ long by 12″ in diameter turning 35 R. P. M. After 100 hours tumbling upon themselves, pebbles are blown with air and reweighed. Per cent loss in weight is determined.

The pebble of the invention, after several different heat treatments, is compared with several predominantly pure 99.5% Al₂O₃ pebbles containing no mullite.

Wearing away of pebbles by attrition on each other is a major source of pebble loss in commercial pebble heater operation. The pebble of the invention has cut this tendency downwards as much as 900% over competitive pebbles. Attrition loss is directly proportional to the amount of recycling as can be seen from Figure I which is a graph showing attrition loss of various pebbles according to Table I. The Various alumina and alumina-mullite pebbles were given accelerated heat and mechanical shock test in apparatus described in copending U. S. application Serial No. 64,936 filed December 13, 1948, U. S. Patent No. 2,644,328, July 7, 1953, and the results are shown in Table II and Figure 2. In the testing procedure, a single continuous stream of pebbles contiguous to each other is first heated from room temperature to 2600° F. at an average rate of approximately 4000° F./min. in a ½ inch diameter tube approximately 48 inches long extending concentric with and in an electrically heated "Globar" tube maintained at 2900° F. The relative size and heat capacity of the heating medium is large compared to the pebbles being heated. Direct radiation from all sides over a short distance to the vertical tube holding the pebbles is enormous. Incremental heating rates much over 5000° F./min. are obtained. Leaving the heated tube, the pebbles are immediately blasted with high velocity, high pressure air jets which cool them at an overall average rate of approximately 15,000° F./min. and at incremental rates greatly in excess of this. Before the chilled pebbles have a chance to equalize thermal strains they are elevated and dropped 6 ft. vertically upon a steel plate before reelevation and recycling through the system.

The testing apparatus was designed to rupture even the best pebble obtainable. Heating and cooling rates from 10 to 100 times those ever expected in the pebble heater are obtained. The improved results and the magnitude of improvement possible can be readily visualized from inspection of Table II and Figure 2. This improvement is attributed to the stronger and more resilient bonding of smaller alumina crystals which are stabilized against plastic deformation and counteracting crystal growth by the mullite crystals in the pebble. In non-stabilized high purity alumina pebbles this crystal growth under cooling strain is remarkable. Such crystal growth occurs by cannibalization of the small $Al_2O_3$ crystals in the bond leaving a cracked, weak, granulated, sugar-type, residual pebble.

EXAMPLE II

TYPE B PEBBLES 6975 lbs. of 325 mesh Bayer process purified alumina precalcined to 2100° F. is mixed with 1332 lbs. of 325 mesh high grade plasticizing ball clay and 1944 lbs. of 325 mesh precalcined Indian kyanite to give a final composition of approximately 50% by weight of alumina and 49.5% mullite, with about 0.5% glass. (All weights determined on dry basis.) Both ball clay and kyanite are carefully chosen to insure a minimum of glass forming impurities such as the oxides of iron and the alkali and alkaline earth metals. The raw materials are formed into pebbles by substantially the same procedure as followed and utilized in Example I.

The resulting pebble is approximately $\frac{5}{16}$" in diameter, has a composition=50 weight per cent alpha alumina, 49.5 weight per cent mullite, with about 0.5 per cent glass and other crystalline impurities and is characterized by high resistance to heat shock and attrition. Crushing resistance between 2 parallel steel plates ranges from 1200 to 1600 pounds and porosity varies within the range of 8 to 12 per cent with an average of about 10.3 per cent total porosity.

Pebbles prepared by the process of Example II, when subjected to attrition tests by rotating a cylindrical drum containing a weighed amount of pebbles for 100 hours at a constant speed of rotation, blowing the pebbles with air, and reweighing, show a per cent loss of weight of 3.1 as compared with a loss of weight of between 17.5 and 29.3 per cent for 99.5 per cent alumina pebbles prepared in a similar manner and given a similar heat treatment.

When the pebbles of the example are given the accelerated heat-mechanical shock test in the testing apparatus referred to in Example I, 250 cycles are required for reaching the half life of the pebble (50 per cent broken) as compared with 138 cycles for the best commercially fired alumina pebble and 175 cycles for a commercially fired alumina pebble refired 24 hours at 3100° F.

EXAMPLE III

TYPE C PEBBLES

An intimate mixture of 2284 lbs. of minus 150 mesh Bayer process purified alumina precalcined to 2050° F., 666 lbs. of minus 150 mesh high grade plasticizing ball clay low in glass forming impurities such as iron, alkali, and alkaline earth metals, and 1945 lbs. of minus 150 mesh high grade Indian kyanite precalcined to 2650° F. is formed into a stiff paste with 835 lbs. of water in a ring roll mill. The resulting mix containing approximately 17% water (by weight) is piston extruded into $\frac{3}{8}$" cylinders which are then cut into slugs $\frac{3}{8}$" in length. The slugs are dried to 12.5% moisture content and then tumbled into spheres in three dimensional tumbling apparatus. Product balls dried to zero moisture content at about 300° F. in a flue gas dryer are calcined in a periodic kiln for 4 hours at 3050° F. The balls are brought to top temperature gradually over a 16 hour period and are allowed to cool to handling temperature over a 24 hour period.

The finished pebbles consist of 78% mullite, 21.6% alpha corundum, and approximately 0.4% glass and impurities. (Per cents by weight on dry basis.) Crushing resistance between parallel steel plates ranges from about 1100 to 1500 pounds and the porosity varies within the range of about 8 to 11 percent.

Pebbles prepared by the process of Example III, when subjected to attrition tests by rotating a cylindrical drum containing a weighed amount of pebbles for 100 hours at a constant speed of rotation, blowing the pebbles with air, and reweighing, show a per cent loss of weight of 3.0 as compared with the loss of weight of between 17.5 and 29.3 per cent for 99.5% alumina pebbles prepared in a similar manner and given a similar heat treatment.

When the pebbles of the example are given the accelerated heat-mechanical shock test in the testing apparatus described in Example I, 350 cycles are required for reaching the half life of the pebble (50 per cent broken) as compared with 138 cycles for the best commercially fired alumina pebble and 175 cycles for a commercially fired alumina pebble refired 24 hours at 3100° F.

Certain modifications of the invention will become apparent to those skilled in the art and the illustrative details disclosed are not to be construed as imposing unnecessary limitations on the invention.

I claim:

1. A process for manufacturing mullite-alumina pebbles having high resistance to breakage under severe conditions of cyclic thermal and mechanical shock, which comprises compacting spheres from a homogeneous plastic mix of 150 to 400 mesh alumina and aluminum silicate in which the silica is in a mol ratio to the alumina of less than 2 to 3; drying said spheres; and calcining the dried spheres at a temperature between 2900° and 3200° F. for at least 2 hours and until their porosity lies between 5 and 20%.

2. A process for manufacturing mullite-alumina pebbles having high resistance to breakage under severe conditions of cyclic thermal and mechanical shock, which comprises compacting $\frac{1}{8}$" to 1" spheres from a finely comminuted homogeneous, aqueous, plastic mix of substantially pure alumina and aluminum silicate in which the silica is in a mol ratio to the alumina of less than 2 to 3; drying said spheres at low superatmospheric temperature to a moisture content below 1 weight per cent; and calcining the dried spheres at a temperature between 2900° and 3200° F. for at least 2 hours and until the porosity of the spheres lies between 5 and 20%, thereby converting said aluminum silicate to mullite and reacting resulting free silica with said alumina to form additional mullite as bonding and stabilizing material between the crystals of said spheres.

3. A process for manufacturing mullite-alumina pebbles substantially free of uncombined silica having high resistance to breakage under severe conditions of cyclic thermal and mechanical shock, which comprises forming a homogeneous aqueous plastic mix consisting of finely comminuted alumina of at least 99% purity and finely comminuted aluminum silicate in which the silica is in a mol ratio to the alumina of less than 2 to 3; adjusting the water content of said mix to between 10 and 20 weight per cent; forming said mix into compact ⅛" to 1" spheres; drying said spheres to a moisture content below 1 weight per cent and calcining the dried spheres at a temperature between 2900° and 3200° F. for at least 2 hours and until their porosity lies between 5 and 20%.

4. The process of claim 3 in which the forming step comprises extruding the plastic mix containing between 10 and 20 weight per cent moisture into rods between ⅛" and 1" in cross-section; cutting said rods into slugs of a length corresponding to their thickness; and shaping the slugs into spheres.

5. A process for manufacturing mullite-alumina pebbles substantially free of uncombined silica and having high resistance to breakage under severe conditions of cyclic thermal and mechanical shock, which comprises forming a homogeneous aqueous plastic mix of 150–400 mesh alumina of at least 99% purity and 150–400 mesh aluminum silicate, the silica of said silicate being in a mol ratio to the total $Al_2O_3$ of less than 2 to 3 and the mol ratio of the silica to alumina in said silicate being at least 1:1; adjusting the water content of said mix between 15 and 20 weight per cent; extruding said mix into rods between ⅛" and 1" in cross-section; cutting the rods into cylinders of a length approximating their diameter; drying said cylinders to a water content between 10 and 15 weight per cent; compacting said cylinders into balls; slowly drying said balls to a moisture content below 1 weight per cent; calcining the dried balls at a temperature between 2900 and 3200° F. for at least 2 hours and until their porosity ranges from 8 to 12%, thereby converting said aluminum silicate to mullite and reacting resulting free silica with said alumina to form additional mullite as bonding material between the crystals of said balls.

6. A process for manufacturing mullite-alumina pebbles substantially free of uncombined silica and having high resistance to breakage under severe conditions of cyclic thermal and mechanical shock, which comprises forming a homogeneous aqueous plastic mix of 150–400 mesh alumina of at least 99% purity and 150–400 mesh aluminum silicate, the silica of said silicate being in a mol ratio to the total $Al_2O_3$ of less than 2 to 3 and the mol ratio of the silicia to alumina in said silicate being at least 1:1; drying said mix to a water content of 16 to 18 weight per cent; forming the partially dried mix into small slugs individually compactable to ⅛" to 1" balls; drying the slugs to a water content of 11.5 to 13 weight per cent; compacting the partially dried slugs into balls by rolling and tumbling; slowly drying the balls to a moisture content below 1 weight per cent; calcining the dried balls at a temperature of 2950 to 3100° F. for at least 2 hours and until the average crystal size of the alumina lies between 1 and 20 microns, thereby converting aluminum silicate to mullite and reacting resulting free silica with said alumina to form additional mullite as bonding material between the crystals of said balls.

7. A process for manufacturing mullite-alumina pebbles containing less than 1 weight per cent free silica and having high resistance to breakage and to attrition under severe conditions of cyclic thermal and mechanical shock, which comprises forming a homogeneous aqueous plastic mix of finely comminuted alumina of at least 99% purity and finely comminuted aluminum silicate in which the silica is in a mol ratio to the total $Al_2O_3$ of less than 2 to 3; adjusting the water content of said mix to between 16 and 18 weight per cent; forming the mix into slugs suitable for compacting individually into ⅛" to 1" balls; drying the slugs to a water content between 10 and 15 weight per cent; compacting the slugs into balls; slowly drying the balls to a moisture content below 1 weight per cent; and calcining the dried balls at a temperature between 2900 and 3200° F. for at least 2 hours and until the average crystal size of the alumina lies between 0.5 and 50 microns so as to convert aluminum silicate to mullite.

8. A process for manufacturing mullite-alumina pebbles containing less than 1 weight per cent free silica and having high resistance to breakage and to attrition under severe conditions of cyclic thermal and mechanical shock, which comprises forming a homogeneous aqueous plastic mix of alumina of at least 99 per cent purity and of a fineness of at least 150 mesh and aluminum silicate comprising at least one silicate of the formula $Al_2O_3 \cdot SiO_2$ and at least one silicate of the formula $Al_2O_3 \cdot 2SiO_2$, the aluminum silicates being of a fineness of at least 150 mesh and the silica therein being in a mol ratio to the total $Al_2O_3$ of less than 2 to 3; adjusting the water content of said mix to the range of 10 to 20 weight per cent; compacting the mix into ⅛" to 1" balls; slowly drying the resulting balls to a moisture content below 1 weight per cent; and calcining the balls at a temperature between 2900 and 3200° F. for at least 2 hours and until their porosity lies between 5 and 20%.

9. A process for manufacturing mullite-alumina pebbles containing less than 1 weight per cent free silica and having high resistance to breakage and to attrition under severe conditions of cyclic thermal and mechanical shock, which comprises forming a homogeneous aqueous plastic mix of alumina of at least 99% purity and of a fineness of at least 150 mesh and aluminum silicate comprising a plasticizing ball clay and kyanite, the aluminum silicate being of a fineness of at least 150 mesh and the silica therein being in a mol ratio to the total $Al_2O_3$ of less than 2 to 3; adjusting the water content of said mix to the range of 10 to 20 weight per cent; compacting the mix into ⅛" to 1" balls; slowly drying the resulting balls to a moisture content below 1 weight per cent; and calcining the dried balls at a temperature between 2900 and 3200° F. for at least 2 hours and until the average alumina crystal size lies in the range of 1 to 25 microns.

10. A process for manufacturing mullite-alumina pebbles substantially free of uncombined silica having high resistance to breakage under severe conditions of cyclic thermal and mechanical shock, which comprises forming a homogeneous aqueous plastic mix consisting of finely comminuted alumina of at least 99% purity and finely comminuted mullite; adjusting the water content of said mix to between 10 and 20 weight per cent; forming said mix into 1/8" to 1" spheres; slowly drying said spheres to a moisture content below 1%; and calcining the dried spheres at a temperature between 2900° and 3200° F. for at least 2 hours and until their porosity lies between 5 and 20%.

11. A mullite-stabilized alumina pebble 1/8" to 1" in diameter consisting essentially of between 66 and 98 weight per cent alumina, between 1 and 33% mullite, and not more than 1 weight per cent free silica and impurities, 70% of the alumina crystals being in the range of 0.5 to 50 microns in size in the form of laths and irregular grains dispersed throughout a cryptocrystalline porphyritic mass in haphazard orientation, said pebble having a crushing strength of at least 1500 pounds (on the basis of a $\frac{5}{16}$" pebble), a porosity between 5 and 20%, and the unmistakable appearance of a homogeneous fine-grained mass.

12. A mullite-stabilized alumina pebble 1/8" to 1" in diameter consisting essentially of between 66 and 98 weight per cent alumina, between 1 and 33% mullite, and not more than 1 weight per cent free silica and impurities, 70% of the alumina crystals being in the range of 1 to 25 microns in size in the form of laths and irregular grains dispersed throughout a cryptocrystalline porphyritic mass in haphazard orientation, said pebble having a crushing strength of at least 1500 pounds (on the basis of a $\frac{5}{16}$" pebble), a porosity between 8 and 12%, and the unmistakable appearance of a homogeneous fine-grained mass.

13. A mullite-stabilized alumina pebble 1/8" to 1" in diameter consisting essentially of between 66 and 98 weight per cent alumina, between 1 and 33% mullite, and not more than 1 weight per cent free silica and impurities, and having a crushing strength of at least 1500 pounds, a porosity between 5 and 20%, and the appearance of a homogeneous fine-grained mass.

14. A fine-grained, smooth, hard mullite-stabilized alumina pebble consisting essentially of between 66 and 98 weight per cent alumina, between 1 and 33 weight per cent mullite formed in situ by heating a mixture of aluminum silicate in which the mol ratio of silica to alumina is at least 1:1 and free alumina sufficient to combine with all of the silica freed by the conversion to mullite, and less than 1 weight per cent free silica and impurities, the mullite and alumina being uniformly dispersed throughout said pebble, a large portion of the alumina being in the form of laths or needles of a maximum length of 200 microns and the balance in the form of irregular grains grading downward from a maximum diameter of 100 microns, of which 10 to 30 per cent range from 50 to 100 microns in maximum diameter, the balance grading downward from 50 microns in maximum diameter, said pebble having the appearance of homogeneity and a crushing strength of at least 1,500 pounds (based on a $\frac{5}{16}$" diameter pebble).

15. A mullite-alumina pebble in the form of a small sphere consisting essentially of 1 to 98 weight per cent of mullite and 2 to 98 weight per cent alumina and less than 2 weight per cent free silica and other impurities, said pebble having a crushing strength of at least 1,200 pounds, a porosity in the range of 5 to 20%, and the appearance of a homogeneous fine-grained mass.

16. A mullite-aluminum pebble in the form of a small sphere consisting essentially of 1 to 98 weight per cent of mullite and 2 to 98 weight per cent alumina and less than 2 weight per cent free silica and other impurities, 70% of the alumina crystals being in the range of 0.5 to 50 microns in size in the form of laths and irregular grain dispersed throughout the pebble, said pebble having a crushing strength of at least 1,200 pounds (on basis of a $\frac{5}{16}$" pebble) a porosity in the range of 8 to 12%, and the appearance of a homogeneous fine-grained mass.

17. A mullite-alumina pebble in the form of a small sphere consisting essentially of 1 to 98 weight per cent of mullite and 2 to 98 weight per cent alumina and less than 2 weight per cent free silica and other impurities, said pebble having a porosity in the range of 5 to 20% and the appearance of a homogeneous fine-grained mass.

18. A fine-grained, smooth, hard mullite-alumina pebble consisting essentially of between 2 and 98 weight per cent alumina, between 1 and 98 weight per cent mullite formed in situ by heating a mixture of aluminum silicate in which the mol ratio of silica to alumina is at least 1:1 and free alumina sufficient to combine with all of the silica freed by the conversion to mullite, and less than 1 weight per cent free silica and impurities, the mullite and alumina being uniformly dispersed throughout said pebble, a large portion of the alumina being in the form of laths or needles of a maximum length of 200 microns and the balance in the form of irregular grains grading downward from a maximum diameter of 100 microns, of which 10 to 30 per cent range from 50 to 100 microns in maximum diameter, the balance grading downward from 50 microns in maximum diameter, said pebble having the appearance of homogeneity.

19. A mullite-alumina pebble consisting essentially of 35 to 65 weight per cent of alumina, 65 to 35 weight per cent mullite, and less than 2 weight per cent free silica and impurities, said pebble having a crushing strength of at least 1,200 pounds (on the basis of a $\frac{5}{16}$" pebble), a porosity in the range of 5 to 20%, and the appearance of a homogeneous fine-grained mass.

20. An unfused alumina-mullite pebble 1/8" to 1" in diameter of a composition 35 to 65% alumina, 65 to 35% mullite, and less than 2% uncombined silica and other impurities (per cents by weight), 80 per cent of the alumina crystals being in the range of 0.5 to 50 microns in size in the form of laths and irregular grains dispersed throughout a cryptocrystalline porphyritic mass, said pebble having a crushing strength of at least 1,200 lbs. (on the basis of a $\frac{5}{16}$" pebble), a porosity between 5 and 20 per cent and the appearance of a homogeneous fine-grained mass.

21. An unfused mullite-alumina pebble 1/8" to 1" in diameter consisting essentially of 66 to 98% mullite, 34 to 2% alumina, and less than 2% uncombined silica and other impurities (per cents by weight), 80% of the alumina crystals therein being in the range of 0.5 to 50 microns in size in the form of laths and irregular grains dispersed throughout a cryptocrystalline porphyritic mass, said pebble having a crushing strength of at least 1,200 lbs. (on the basis of a $\frac{5}{16}$" pebble), a porosity between 8 and 15 per cent and the appearance of a homogeneous fine-grained mass.

22. An unfused mullite-alumina pebble 1/8" to 1" in diameter consisting essentially of 66 to 98% mullite, 34 to 2% alumina, and less than 2% uncombined silica and other impurities (per cents by weight), and having a crushing strength of at least 1,500 lbs. (on the basis of a 1/8" pebble) and a porosity between 5 and 20 per cent.

SAM P. ROBINSON.

References Cited in the file of this patent

UNITED STATES PATENTS

| Number | Name | Date |
| --- | --- | --- |
| 1,741,920 | Curtis | Dec. 31, 1929 |
| 1,752,867 | Trostel | Apr. 1, 1930 |
| 1,802,296 | Willets | Apr. 21, 1931 |
| 1,942,879 | Riddle | Jan. 9, 1934 |
| 1,966,407 | Hauman | July 10, 1934 |
| 1,966,408 | Hauman | July 10, 1934 |
| 2,007,742 | Brown et al. | July 9, 1935 |
| 2,017,056 | Easter | Oct. 15, 1935 |
| 2,035,845 | Stanton | Mar. 31, 1936 |
| 2,272,618 | Fessler et al. | Feb. 10, 1942 |
| 2,304,133 | Wilson | Dec. 8, 1942 |
| 2,316,726 | Spicer et al. | Apr. 13, 1943 |
| 2,389,636 | Ramseyer | Nov. 27, 1945 |
| 2,432,520 | Ferro | Dec. 16, 1947 |
| 2,463,979 | Langrod | Mar. 8, 1949 |

FOREIGN PATENTS

| Number | Country | Date |
| --- | --- | --- |
| 316,129 | Great Britain | 1930 |

OTHER REFERENCES

Harvey Preprint 75-25, "The Electrochemical Society" (1939), pages 313, 319, 325 to 328, "Refractories of the Alumina-Silica Series."

Norton, Chem. & Met. Eng., July 1946, pages 116–119.